(12) United States Patent
Seo et al.

(10) Patent No.: US 10,141,576 B2
(45) Date of Patent: Nov. 27, 2018

(54) ELECTRODE STRUCTURE FOR LITHIUM SECONDARY BATTERY AND LITHIUM SECONDARY BATTERY HAVING THE ELECTRODE STRUCTURE

(71) Applicant: RESEARCH & BUSINESS FOUNDATION SUNGKYUNKWAN UNIVERSITY, Suwon-si (KR)

(72) Inventors: Su-Jeong Seo, Suwon-si (KR); Young-Il Song, Suwon-si (KR); Jung-Kab Park, Suwon-si (KR); Tae-Yoo Kim, Suwon-si (KR); Hwa-Jin Son, Suwon-si (KR); Jin-Ha Shin, Siheung-si (KR); Jungwoo Lee, Suwon-si (KR); Youngil Na, Suwon-si (KR); Younglae Cho, Suwon-si (KR); Jung-Ho Park, Seoul (KR); Seung-Bin Baeg, Suwon-si (KR); Byung-Wook Ahn, Suwon-si (KR); Sook-Young Yun, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 49 days.

(21) Appl. No.: 15/000,369

(22) Filed: Jan. 19, 2016

(65) Prior Publication Data

US 2016/0344021 A1 Nov. 24, 2016

(30) Foreign Application Priority Data

Jan. 19, 2015 (KR) .......................... 10-2015-0008797

(51) Int. Cl.
*H01M 4/131* (2010.01)
*H01M 4/38* (2006.01)
(Continued)

(52) U.S. Cl.
CPC ............. *H01M 4/661* (2013.01); *H01M 4/66* (2013.01); *H01M 4/663* (2013.01); *H01M 4/667* (2013.01); *H01M 10/0525* (2013.01)

(58) Field of Classification Search
CPC .... H01M 4/38; H01M 10/0525; H01M 4/661; H01M 4/0404; H01M 4/134;
(Continued)

(56) References Cited

U.S. PATENT DOCUMENTS

| 5,072,336 A | 12/1991 | Kurabayashi et al. | |
| 2009/0261305 A1* | 10/2009 | Carroll | H01B 1/16 252/513 |

(Continued)

FOREIGN PATENT DOCUMENTS

| JP | 2007-123141 A | 5/2007 |
| JP | 2010-218848 A | 9/2010 |
| KR | 10-2005-0074818 A | 7/2005 |

*Primary Examiner* — Muhammad S Siddiquee
(74) *Attorney, Agent, or Firm* — NSIP Law

(57) ABSTRACT

There is provided an electrode for a lithium secondary battery. The electrode include a current collector; nanoparticles distributed on a surface of the current collector, each of the nanoparticles including a transition metal or an oxide of the transition metal; and an active material layer disposed on a surface of the current collector having the nanoparticles distributed thereon. This electrode may be employed as a negative electrode for the lithium second battery, to improve a capacity of the lithium second battery.

10 Claims, 3 Drawing Sheets

(51) Int. Cl.
*H01M 4/48* (2010.01)
*H01M 10/0525* (2010.01)
*H01M 4/66* (2006.01)

(58) Field of Classification Search
CPC ...... H01M 4/131; H01M 4/366; H01M 4/502; H01M 4/523; H01M 4/48; H01M 4/625; H01M 2004/027
See application file for complete search history.

(56) References Cited

U.S. PATENT DOCUMENTS

| | | | |
|---|---|---|---|
| 2010/0002357 A1* | 1/2010 | Kim, II | H01G 11/46 361/305 |
| 2012/0251887 A1* | 10/2012 | Han | H01M 4/366 429/231.5 |
| 2017/0352908 A1* | 12/2017 | Noguchi | H01M 10/052 |

\* cited by examiner

ELECTRODE STRUCTURE FOR LITHIUM SECONDARY BATTERY AND LITHIUM SECONDARY BATTERY HAVING THE ELECTRODE STRUCTURE

CROSS-REFERENCE TO RELATED APPLICATION

The present application claims a priority to a Korean patent application number 10-2015-0008797 filed on Jan. 19, 2015, the entire disclosure of which is incorporated herein in its entirety by reference.

BACKGROUND

Technical Field

The present disclosure generally relates to an electrode, and a lithium second battery including the electrode with an improved capacity.

Discussion of Related Arts

Conventionally, a lithium second battery includes a negative electrode having a negative electrode current collector, and a negative electrode active material layer; a positive electrode having a positive electrode current collector, and a positive electrode active material layer; and an electrolyte disposed therebetween to allow migration of lithium ions. The lithium second battery may be applied not only as a power supply for a mobile device, but also as a power supply for an electric, hybrid electric, or plug-in hybrid electric vehicle, and further as a power storage device using a smart grid. That is, the lithium second battery will be more widely employed.

The lithium second battery generally includes graphite as a negative electrode active material thereof. However, when the graphite is used, the battery may be insufficient in a capacity for the electric vehicle. Hence, for a capacity improvement, the negative electrode active material has been studied.

One of the studies has proposed a carbon-based material other than the conventional graphite or a metal compound as the negative electrode active material. However, those materials also have challenges about material stability, battery life span, etc. Thus, in order to be commercialized, those materials need to be improved.

SUMMARY

From considerations of the above, the present disclosure provides an electrode for a lithium second battery to improve a capacity thereof. Further, the present disclosure provides a lithium second battery including the electrode.

In one aspect of the present disclosure, there is provided an electrode for a lithium secondary battery, the electrode comprising: a current collector; nanoparticles distributed on a surface of the current collector, each of the nanoparticles including a transition metal or an oxide of the transition metal; and an active material layer disposed on a surface of the current collector having the nanoparticles distributed thereon.

In one aspect of the present disclosure, there is provided an electrode for a lithium secondary battery, the electrode comprising: a current collector; a graphene layer disposed on a surface of the current collector; nanoparticles distributed on a surface of the graphene layer, each of the nanoparticles including a transition metal or an oxide of the transition metal; and an active material layer disposed on a surface of the graphene layer having the nanoparticles distributed thereon.

In one embodiment, the active material layer may include a negative electrode active material for the lithium second battery.

In one embodiment, at least a portion of the nanoparticles may comprise particles including an oxide of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

In one embodiment, at least a portion of the nanoparticles may comprise particles, each particle including a core and a shell at least partially coating the core, the shell being made of an oxide of the core material, wherein the core material may include at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

In one embodiment, at least a portion of the nanoparticles may comprise particles, each particle including a core and a shell at least partially coating the core, the shell being made of a carbon-based material, wherein the core may be made of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

In one embodiment, the nanoparticles may be distributed on a plane such that about 40 to 95% of the plane is exposed.

In one aspect of the present disclosure, there is provided a lithium secondary battery comprising: a negative electrode comprising a negative electrode current collector, nanoparticles distributed on a surface of the current collector, and a negative electrode active material layer disposed on a surface of the current collector having the nanoparticles distributed thereon, wherein each of the nanoparticles includes a transition metal or an oxide of the transition metal; a positive electrode comprising a positive electrode current collector opposite the negative electrode current collector, and a positive electrode active material layer disposed on the a positive electrode current collector so as to face the negative electrode active material layer; and an electrolyte disposed between the negative and positive electrodes.

In one aspect of the present disclosure, there is provided a lithium secondary battery comprising: a negative electrode comprising a negative electrode current collector, a graphene layer disposed on a surface of the current collector, nanoparticles distributed on a surface of the graphene layer, and a negative electrode active material layer disposed on a surface of the graphene layer having the nanoparticles distributed thereon, wherein each of the nanoparticles includes a transition metal or an oxide of the transition metal; a positive electrode comprising a positive electrode current collector opposite the negative electrode current collector, and a positive electrode active material layer disposed on the a positive electrode current collector so as to face the negative electrode active material layer; and an electrolyte disposed between the negative and positive electrodes.

In accordance with the present disclosure, the lithium secondary battery may have a significantly improved capacity due to the distributed nanoparticles including the transition metal or the oxide thereof between the current collector and the active material layer.

Further, the lithium second battery may have a further enhanced capacity due to decreased interfacial resistance between the current collector and the active material layer via the added graphene layer therebetween.

BRIEF DESCRIPTION OF THE DRAWINGS

A brief description of each drawing is provided to more fully understand the drawings, which is incorporated in the detailed description of the disclosure.

DETAILED DESCRIPTIONS

Examples of various embodiments are illustrated in the accompanying drawings and described further below. It will be understood that the discussion herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated elements, and/or components, but do not preclude the presence or addition of one or more other elements, components, and/or portions thereof. As used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the present disclosure. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.3, or 5.5 to 10, or 2.7 to 6.1.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Figure 1:
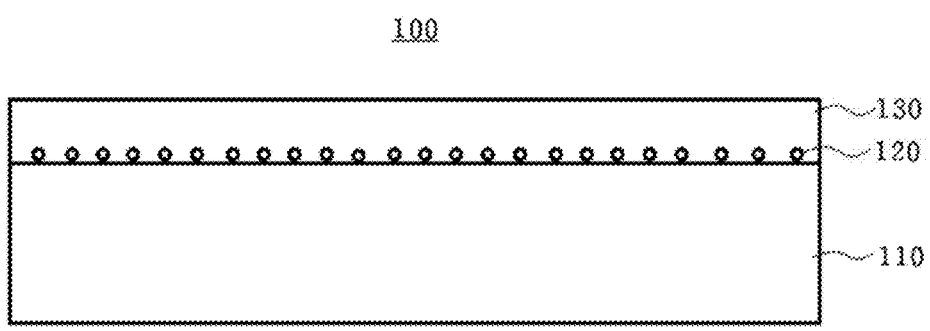
FIG. 1 illustrates an electrode for a lithium secondary battery in accordance with one embodiment of the present disclosure.

FIG. 1 illustrates an electrode for a lithium secondary battery in accordance with one embodiment of the present disclosure.

Referring to FIG. 1, an electrode 100 in accordance with one embodiment of the present disclosure may include a current collector 110, nanoparticles 120, and an active material layer 130.

The current collector 110 may be made of an electrically conductive material. The current collector 110 may act to collect electrons generated from the active material layer 130 and to deliver the collected electrons out of the electrode. A material of the current collector 110 may be not limited as long as the material is known to the skilled person to the art as materials for a current collector material for a lithium secondary battery. For example, materials of the current collector 110 may include copper, nickel, stainless steel, titanium, a nickel foam, a copper foam, a polymer coated with a conductive metal, or combinations thereof.

The nanoparticles 120 may be distributed on a surface of the current collector 110. For example, the nanoparticles 120 may be spaced from one another on the same plane. In one example, the nanoparticles 120 may be spaced from one another to expose about 5 to 95% of an entire surface area of the current collector 110. The nanoparticles 120 each may have a particle size of about several to hundreds nanometers. The nanoparticles 120 may include at least one selected from a group consisting of metal powders, metal-oxide powders, alloy powders, etc.

In one embodiment, the nanoparticles 120 may include transition metal oxide particles. For example, the nanoparticles 120 may include particles made of an oxide of at least one of titanium (Ti), vanadium (V), chrome (Cr), manganese (Mn), iron (Fe), cobalt (Co), nickel (Ni), copper (Cu), zinc (Zn), an alloy thereof, and a composite thereof, etc.

In another embodiment, the nanoparticles 120 may include transition metal particles, whose surfaces each is at least partially coated with an oxide thereof. For example, each of the nanoparticles 120 may include a core and a shell at least partially covering a surface of the core, wherein the core may be made of at least one of titanium (Ti), vanadium (V), chrome (Cr), manganese (Mn), iron (Fe), cobalt (Co), nickel (Ni), copper (Cu), zinc (Zn), an alloy or composite thereof, etc., and the shell may be made of an oxide of the material of the core.

In yet another embodiment, the nanoparticles 120 may include transition metal particles, whose surfaces each may be at least partially coated with a carbon layer. For example, each of the nanoparticles 120 may include a core and a shell at least partially covering a surface of the core, wherein the core may be made of at least one of titanium (Ti), vanadium (V), chrome (Cr), manganese (Mn), iron (Fe), cobalt (Co), nickel (Ni), copper (Cu), zinc (Zn), an alloy or composite thereof, etc., and the shell may be made of a carbon-based material. In this connection, the shell made of the carbon-based material may include a stack of carbon-atoms layers.

The nanoparticles 120 may be distributed on a surface of the current collector 110 using a variety of methods. For example, the nanoparticles 120 may be dispersed in a solvent, which, in turn, may be applied on a surface of the current collector 110 using dip coating, spin coating, spray coating methods, etc.

The active material layer 130 may be disposed on the current collector 110 having the nanoparticles 120 distributed thereon. In one embodiment, the active material layer 130 may be formed on the current collector 110 by applying, on surface of the current collector 110, a given thickness of active material slurry comprising an electrode active material, a binder, and a conductive material, and, thereafter, drying the applied slurry.

The electrode active material may not be limited as long as the material allows insertions and extractions of lithium ions into and from an electrode, in particular, a negative electrode. For example, the electrode active material may include carbon-based materials, a lithium metal, silicon, or tin, etc. The electrode active material may be preferable the carbon-based material. The carbon-based material may include crystalline carbon, amorphous carbon, etc. Highly crystalline carbon may include artificial graphite such as MCMB (graphitized mesocarbon microbeads), MCF (graphitized mesocarbon fiber), MAG (massive graphite), etc., a natural graphite, etc. The amorphous carbon may include hard carbon resulting from pyrolysis of phenol resin, furan resin, or etc., soft carbon resulting from carbonization of cokes, pitch, or etc. or the like.

The binder may improve not only mutual bonding between the electrode active materials, but also bonding between the electrode active materials and the current collector 110. A material of the binder may be not limited as long as the material is known to the skilled person to the art. For example, the binder may include a water-soluble binder, a water-insoluble binder or a mixture thereof. For example, the water-insoluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder may include a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

The conductive material may be included to impose electrical conductivity to the active material layer 130. Any electrically conductive material may be used as the conductive material unless it causes a chemical change in the lithium second battery. Specific examples of the conductive material may include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

Figure 2:
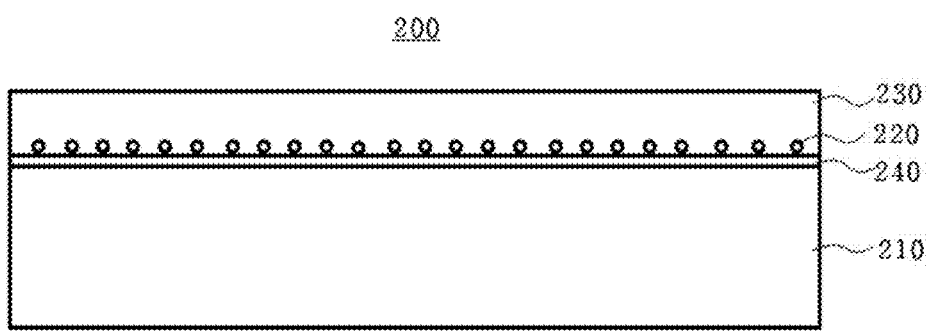
FIG. 2 illustrates an electrode for a lithium secondary battery in accordance with another embodiment of the present disclosure.

FIG. 2 illustrates an electrode for a lithium secondary battery in accordance with another embodiment of the present disclosure.

Referring to FIG. 2, an electrode 200 in accordance with another embodiment of the present disclosure may include a current collector 210, nanoparticles 220, a graphene layer 240, and an active material layer 230.

The graphene layer 240 may be disposed on a surface of the current collector 210. The nanoparticles 220 may be distributed on a surface of the graphene layer 240. The active material layer 230 may be disposed on the graphene layer 240 having the nanoparticles 220 distributed thereon. That is, this embodiment have following features: the electrode 200 further includes the graphene layer 240 between the current collector 210 and the active material layer 23; the nanoparticles 220 are distributed on a surface of the graphene layer 240; and the active material layer 230 is disposed on the graphene layer 240 having the nanoparticles 220 distributed thereon. Apart from the above features, the embodiment of FIG. 2 may be substantially similar to or identical with the embodiment of FIG. 1. Thus, descriptions about the identical features therebeween will be omitted, and different features therebeween will be described below.

Graphene is an allotrope of carbon in the form of a two-dimensional, atomic-scale, honey-comb lattice in which one atom forms each vertex. Such graphene may form the graphene layer 240. The graphene layer 240 may be formed of a single graphene layer. In an alternative, the graphene layer 240 may be formed of a stack of graphene layers. The graphene layer 240 may be formed on the current collector 210 by a growth of graphene directly on the current collector 210. Alternatively, the graphene layer 240 may be formed on the current collector 210 by a transfer of previously-grown graphene onto a surface of the current collector 210. The growth method of the graphene may not be limited as long as the method is known to the skilled person to the art. For example, the graphene growth method may include a physical vapor deposition (PVD), or a chemical vapor deposition (CVD).

When the graphene layer 240 is dispose between the current collector 210 and the active material layer 230, it may result in a decrease in interfacial resistance between the current collector 210 and the active material layer 230. For example, when the active material layer 230 includes a carbon-based active material, the graphene of the graphene layer 240 made of carbon may reduce effectively the interfacial resistance between the current collector 210 and the active material layer 230. This may lead to an improved output of a lithium second battery including the electrode 200 in accordance with this embodiment. Further, the graphene layer 240 may improve bonding between the current collector 210 and the active material layer 230. This may lead to improved life span, capacity, and the like of a lithium second battery including the electrode 200 in accordance with this embodiment.

Figure 3:
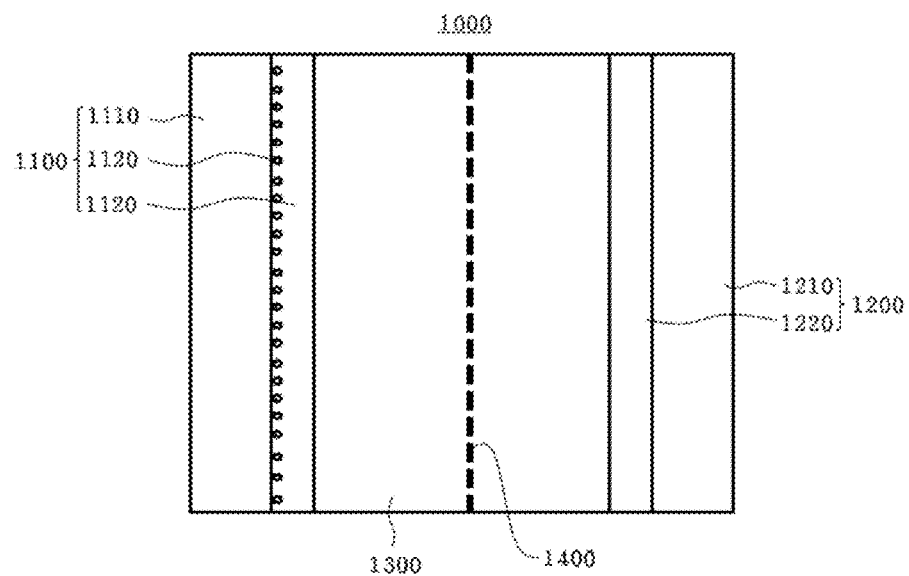
FIG. 3 illustrates a lithium second battery in accordance with one embodiment of the present disclosure.

FIG. 3 illustrates a lithium second battery in accordance with one embodiment of the present disclosure.

Referring to FIG. 3, the lithium second battery 1000 in accordance with one embodiment of the present disclosure may include a negative electrode 1100, a positive electrode 1200, and an electrolyte 1300.

The negative electrode 1100 may be implemented by the electrode 100 as illustrated in FIG. 1, or by the electrode 200 as illustrated in FIG. 2. Thus, details about the negative electrode 1100 will be omitted below. For the sake of convenience of illustration, the current collectors 110 and 210 in FIG. 1 and FIG. 2 respectively will be collectively referred to as "a negative electrode current collector 1110" below. Further, the active material layers 130 and 230 in FIG. 1 and FIG. 2 respectively will be collectively referred to as "a negative electrode active material layer 1130" below.

The positive electrode 1200 may be not limited in a configuration thereof as long as it is known to the skilled person to the art for a positive electrode for a lithium secondary battery. For example, the positive electrode 1200 may include a positive electrode current collector 1210 disposed opposite the negative electrode current collector 1110, and a positive electrode active material layer 1220 disposed at the negative electrode active material layer 1130 side of the positive electrode current collector 1210. The positive electrode active material layer 1220 may include a positive electrode active material. The positive electrode active material may be not limited as long as the material is known to the skilled person to the art as a positive electrode active material for a lithium secondary battery. For example, the positive electrode active material may include $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$, etc. Such materials may be used alone or in a combination of at least two thereof. In an alternative, the positive electrode active material may include a sulfide, a selenide, a halide or etc.

The electrolyte 1300 may be not limited in a material thereof as long as the material is known to the skilled person to the art as an electrolyte material for a lithium secondary battery. In one embodiment, the electrolyte 1300 may include a non-aqueous electrolyte, where the non-aqueous electrolyte may include a non-aqueous organic solvent and a lithium salt. The non-aqueous electrolyte may serve as a medium through which ions may participate in electrochemical reactions of the lithium battery. The non-aqueous electrolyte may use an organic solvent. Examples of the non-aqueous organic solvent may include carbonate solvents, ester solvents, ether solvents, ketone solvents, alcohol solvents, or aprotic solvents. Examples of the carbonate solvents may include dimethyl carbonate (DMC), diethyl carbonate (DEC), ethyl methyl carbonate (EMC), dipropyl carbonate (DPC), methyl propyl carbonate (MPC), ethyl propyl carbonate (EPC), ethylene carbonate (EC), propylene carbonate (PC), fluoroethylene carbonate (FEC), butylene carbonate (BC), or the like. Examples of the ester solvents may include methyl acetate, ethyl acetate, n-propyl acetate, dimethylethyl acetate, methyl propionate, ethyl propionate, gamma-butyrolactone, decanolide, valerolactone, mevalonolactone, caprolactone, or the like. Examples of the ether solvents may include dibutyl ether, tetraglyme, diglyme, dimethoxyethane, 2-methyltetrahydrofuran, tetrahydrofuran, or the like. Examples of the ketone solvents may include cyclohexanone, or the like. Examples of the alcohol solvents may include isopropyl alcohol, ethyl alcohol, or the like. Examples of the aprotic solvents may include nitriles such as R—CN (R is a $C_2$ to $C_{20}$ linear, branched or cyclic hydrocarbon group, and R—CN may have a double-bond aromatic ring, or ether bond), amides such as dimethylformamide, dioxolanes such as 1,3-dioxolane, sulfolanes, or the like. The nonaqueous organic solvent may be used alone. Alternatively, at least two of the nonaqueous organic solvents may be used in combination.

The nonaqueous solvent may include a lithium salt. The lithium salt may be dissolved in the organic solvent to be a source of lithium ions in a battery to allow fundamental operation of the lithium secondary battery. For example, the lithium salt may facilitate migration of lithium ions between the positive electrode 1200 and the negative electrode 1100. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural numbers), LiCl, LiI and $LiB(C_2O_4)_2$ (lithium bis(oxalate) borate; LiBOB), etc. Such lithium salts may be employed alone or in a combination of at least two thereof.

The lithium second battery 1000 in accordance with one embodiment of the present disclosure may further include a separator 1400 between the negative electrode 1100 and the positive electrode 1200. The separator 1400 may be not limited in a configuration thereof as long as it is known to the skilled person to the art for a separator for a lithium secondary battery. The separator is provided between the positive electrode and the negative electrode to electrically insulate the two electrodes from each other, and to retain the electrolyte solution. Specific examples of separators may include a single layer or multiple-layers made of polyethylene, polypropylene, polyvinylidene fluoride, etc.

Example

Present Example

Figure 4:
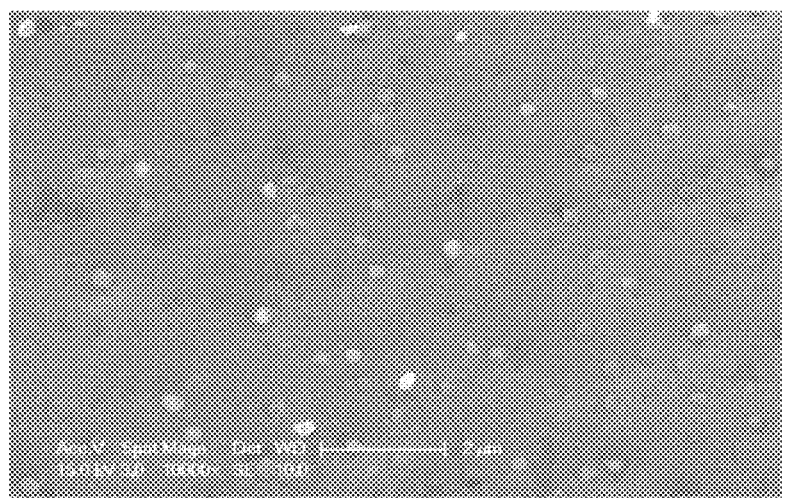
FIG. 4 shows a picture of nanoparticles distributed on a surface of a graphene layer.

Graphene was transferred onto a surface of a copper foil to form a graphene layer. A solution was prepared containing dispersed copper nanoparticles therein, wherein each nanoparticle was coated with a copper oxide. Thereafter, the solution was applied on a surface of the graphene layer using a spin-coating method, which, in turn, was dried. In this way, the nanoparticles were distributed on a surface of the graphene layer. FIG. 4 shows a picture of the nanoparticles distributed on a surface of the graphene layer.

Thereafter, a negative electrode active material paste was prepared by a mixture of NMP (n-methyl pyrrolidone), MAG and PVDF. The negative electrode active material paste was applied on the graphene layer having the nanoparticles distributed thereon, and, then, was dried in a 110° C. oven for about 1 to 2 hours. In this way, a negative electrode was prepared.

Meanwhile, a positive electrode active material paste was applied on an aluminum foil and was dried, to prepare a positive electrode.

Next, the negative electrode and the positive electrode together a separator interposed therebetween were received in a container, into which, in turn, an electrolyte was injected, to form a lithium second battery in accordance with the present example.

Comparative Example

Graphene was transferred onto a surface of a copper foil to form a graphene layer. Thereafter, a negative electrode active material paste was prepared by a mixture of NMP (n-methyl pyrrolidone), MAG and PVDF. The negative electrode active material paste was applied on the graphene layer, and, then, was dried. In this way, a negative electrode was prepared. This is, this comparative example was different from the above present example in that the comparative example dispenses with the nanoparticles distributed on the graphene layer.

As in the above present example, a positive electrode active material paste was applied on an aluminum foil and was dried, to prepare a positive electrode. Next, the negative electrode and the positive electrode together a separator interposed therebetween was received in a container, into which, in turn, an electrolyte was injected, to form a lithium second battery in accordance with the comparative example.

Comparison Results

Figure 5:
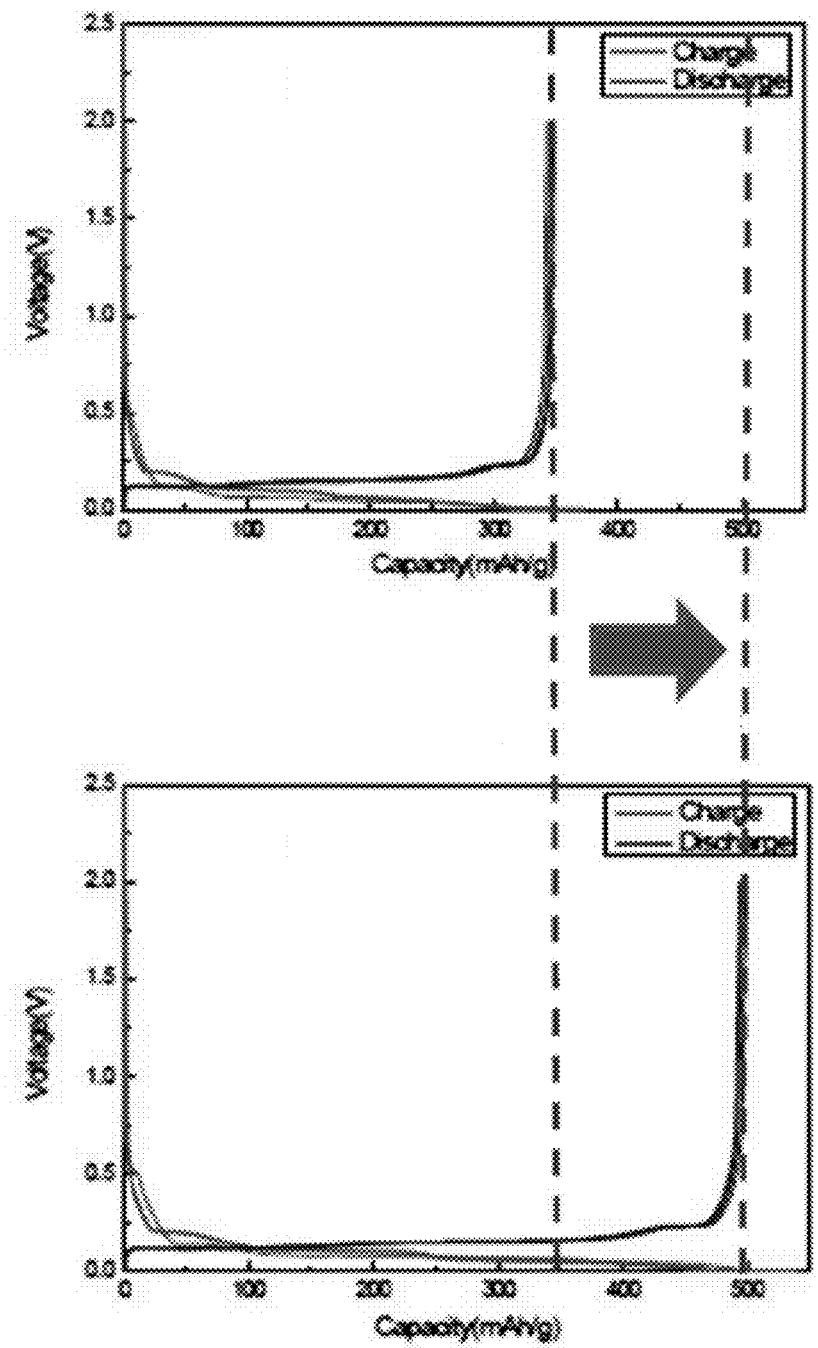
FIG. 5 illustrates graphs respectively describing charging/discharging properties of lithium second batteries in accordance with the present and comparative examples.

FIG. 5 illustrates graphs respectively describing charging/discharging properties of the lithium second batteries in accordance with the present and comparative examples. In FIG. 5, an upper graph is directed to charging/discharging properties of the lithium second battery in accordance with the comparative example, while a lower graph is directed to charging/discharging properties of the lithium second battery in accordance with the present example.

Referring to FIG. 5, the lithium second battery in accordance with the comparative example exhibits a capacity of about 350 mAh/g, while the lithium second battery in accordance with the present example exhibits a capacity of about 500 mAh/g.

In other words, when the copper nanoparticles, each being coated with the copper oxide are disturbed between the graphene layer and the negative electrode active material layer, the lithium second battery may exhibit about 30% improvement in the capacity thereof.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

| Reference numerals | |
|---|---|
| 100, 200: electrode | 110, 210: current collector |
| 120, 220: nanoparticle | 130, 230: active material layer |
| 1000: lithium second battery | 1100: negative electrode |
| 1200: positive electrode | 1300: electrolyte |
| 1400: separator | |

What is claimed is:

1. An electrode for a lithium battery, the electrode comprising:
    a current collector;
    nanoparticles distributed on the current collector such that 5 to 95% of an entire surface area of a plane of the current collector is exposed, each of the nanoparticles comprising a transition metal or an oxide of the transition metal; and
    an active material layer disposed on the current collector.

2. The electrode of claim 1, wherein the active material layer comprises a negative electrode active material.

3. The electrode of claim 1, wherein at least some of the nanoparticles comprise an oxide of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

4. The electrode of claim 1, wherein
    at least some of the nanoparticles comprises a core and a shell at least partially coating the core,
    the shell is made of an oxide of the core material, and
    the core material comprises at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

5. The electrode of claim 1, wherein
    at least some of the nanoparticles comprise a core and a shell at least partially coating the core,
    the shell is made of a carbon-based material, and
    the core is made of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

6. A lithium battery, comprising:
    a negative electrode comprising a negative electrode current collector, nanoparticles distributed on the current collector, and a negative electrode active material layer disposed on the current collector;
    a positive electrode comprising a positive electrode current collector opposite the negative electrode current collector, and a positive electrode active material layer disposed on the positive electrode current collector so as to face the negative electrode active material layer; and
    an electrolyte disposed between the negative and positive electrodes,
    wherein at least some of the nanoparticles comprise a core and a shell at least partially coating the core,
    wherein the shell is made of a carbon-based material, and
    wherein the core is made of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

7. The battery of claim 6, wherein others of the nanoparticles comprise an oxide of at least one selected from a group consisting of titanium (Ti), vanadium (V), chrome (Cr), manganese (Mn), iron (Fe), cobalt (Co), nickel (Ni), copper (Cu), zinc (Zn), an alloy thereof, and a composite thereof.

8. The battery of claim 6, wherein others of the nanoparticles comprise a another core and another shell at least partially coating the another core, the another shell being made of an oxide of the core material.

9. The battery of claim 6, wherein the core is made of at least one selected from a group consisting of vanadium (V), chrome (Cr), manganese (Mn), iron (Fe), cobalt (Co), nickel (Ni), copper (Cu), zinc (Zn), an alloy thereof, and a composite thereof.

10. The battery of claim 6, wherein the core is not made of an oxide.

* * * * *